UNITED STATES PATENT OFFICE.

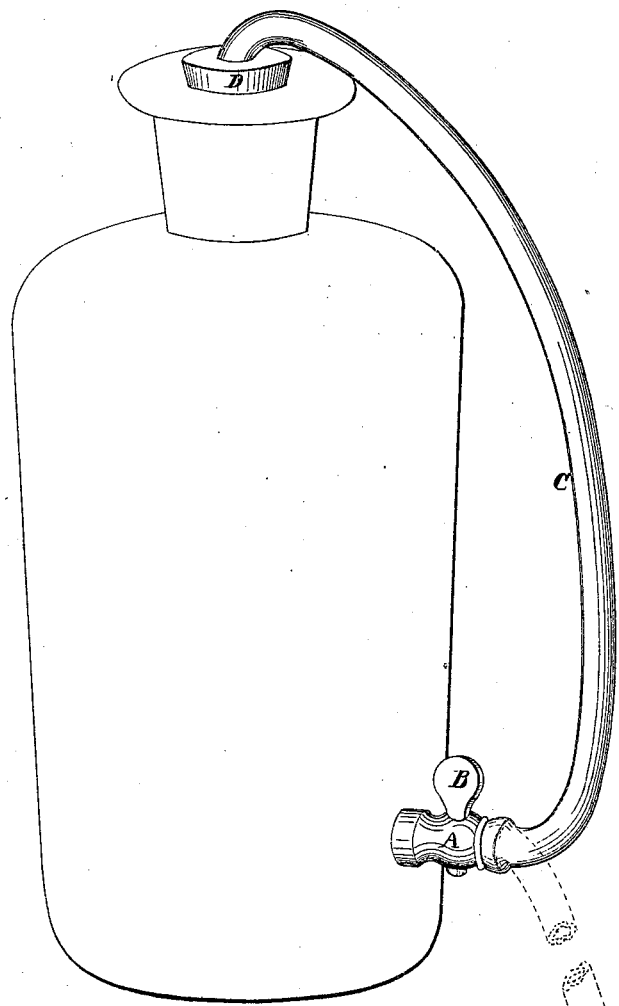

G. W. DOTY, E. A. STEIN, AND W. F. STEIN, OF RAVENNA, OHIO.

PHOTOGRAPHER'S DECANTER.

Specification forming part of Letters Patent No. 48,664, dated July 11, 1865.

*To all whom it may concern:*

Be it known that we, G. W. DOTY, E. A. STEIN, and W. F. STEIN, of Ravenna, in the county of Portage and State of Ohio, have invented certain new and useful Improvements in a Decanter for Photography, &c.; and we do hereby declare that the following is a full and complete description of the construction and operation of the same, reference being had to the accompanying drawing, making a part of this specification.

The figure represents the decanter, which is made of glass or its equivalent. Near the lower end is a glass faucet, A, provided with a glass stopper, B. To the end of the faucet is connected a rubber tube, C, the other end of which passes through a cork, D, the tube being of such a length that the cork can be placed in the neck of the bottle, as represented in the drawing, or detached from it and an ordinary stopper used.

This decanter has many advantages, tested by its practical use. It is found to be of great utility in decanting solutions—such as tinctures—where there is a sediment or deposit at the bottom, and also for a drop-bottle to be used by druggists and physicians. By means of the glass faucet one or more drops can be taken from the tincture without disturbing the sediment or removing the bottle from the shelf; and in the same way valuable oils and perfumes can readily be dropped, without the waste resulting from dropping them in the ordinary way.

A decanter constructed principally for a drop-bottle need not have the tube C connected with the faucet, but simply be provided with the faucet and stopper; and when used for treating photographic plates there can be a projection extending out from the decanter, near the lower end, to which the elastic tube can be connected, thereby dispensing with the faucet. By taking out the cork D and turning down the tube C, as indicated by the dotted lines, the pure solution will run from the decanter through the tube out at the end, and can be distributed over the plate in the most desirable manner, when the tube can be turned up and the cork replaced, the solution running back into the decanter, thus rendering it most convenient in practical use.

In treating the nitrate of silver solution as used by photographers the object of the decanter is for holding the solution so as to allow the organic matter to settle to the bottom and decant the solution without disturbing the sediment. Silver solution treated in this manner is purer than can be obtained by any other process, for in the use of a filter the particles, being so small, pass through and injure the solution.

Another advantage of using the decanter which so perfectly separates the solution from the organic matter is that it lessens the quantity of acid otherwise required, and consequently gives more intensity to the plate, as is well known to the photographer. In this way, having such a pure solution, the operator is enabled to make all positives and negatives without the least blemish in regard to fogginess, streaks, or spots arising from particles of matter settling on the plate, as is more or less the case in ordinary treatment.

In using the decanter there is great saving of silver, which is quite an object, for it has been proved that in the use of filters where twenty-four are used in the ordinary manner they will absorb to the amount of one ounce of crystal nitrate of silver, this being entirely saved by the decanter. Collodion solution used by photographers can be prepared in the same manner, thereby dispensing with the collodion filter.

The solution may be decanted off into another vessel, by either the faucet or tube, without disturbing the sediment, which may have been precipitated below the orifice for the tube or faucet.

One great advantage of arrangement is the convenience with which the bottle can be closed by cork D, thus preventing both evaporation and dripping at the same time. By the use of the cork a shorter tube may be employed without liability to have the end drop out of the mouth of the bottle. When the cork is employed the tube may be wound around the neck of the bottle and the cork caught under the fold of the tube, thereby fastening it up out of the way, when the bottle can be readily handled for filling or emptying without any dripping from the tube.

We are aware that a decanter with a tube has been employed by photographers, but we believe the above-described apparatus is an improvement over anything heretofore known.

Having thus fully described our invention, what we claim is—

The above-described decanter, when provided with the stop-cock, tube, and cork, substantially in the manner and for the purposes set forth.

G. W. DOTY.
E. A. STEIN.
W. F. STEIN.

Witnesses:
M. PARSON,
M. STUART.